US011048825B2

(12) United States Patent
Wei et al.

(10) Patent No.: US 11,048,825 B2
(45) Date of Patent: *Jun. 29, 2021

(54) MANAGING A SMART CONTRACT ON A BLOCKCHAIN

(71) Applicant: Advanced New Technologies Co., Ltd., George Town (KY)

(72) Inventors: Changzheng Wei, Hangzhou (CN); Ying Yan, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/098,124

(22) Filed: Nov. 13, 2020

(65) Prior Publication Data

US 2021/0064784 A1   Mar. 4, 2021

Related U.S. Application Data

(63) Continuation of application No. 16/777,110, filed on Jan. 30, 2020, now Pat. No. 10,839,107, which is a (Continued)

(30) Foreign Application Priority Data

May 30, 2019   (CN) .......................... 201910464790.1

(51) Int. Cl.
*G06F 21/64* (2013.01)
*G06F 21/60* (2013.01)

(52) U.S. Cl.
CPC ............ *G06F 21/64* (2013.01); *G06F 21/602* (2013.01)

(58) Field of Classification Search
None
See application file for complete search history.

(56) References Cited

U.S. PATENT DOCUMENTS

2018/0330343 A1   11/2018  Gray
2019/0036932 A1*   1/2019  Bathen ................. H04L 9/3231
(Continued)

FOREIGN PATENT DOCUMENTS

CN   105812332   7/2016
CN   107342858   11/2017
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Brandon S Hoffman
(74) *Attorney, Agent, or Firm* — Fish & Richardson P.C.

(57) ABSTRACT

A computer-implemented method includes: in response to a first client device invoking a transaction with respect to a target smart contract, obtaining, by a blockchain node device in a blockchain, encrypted contract codes of the target smart contract; transmitting the encrypted contract codes of the target smart contract to a trusted execution environment; in response to determining that the target smart contract is not a managed smart contract, extracting a decryption key stored in the trusted execution environment, in which the decryption key corresponds to the encrypted contract codes of the target smart contract; decrypting the encrypted contract codes of the target smart contract; executing the decrypted contract codes of the target smart contract in the trusted execution environment; encrypting the execution result; and transmitting the encrypted execution result to the distributed ledgers of the blockchain for storage.

18 Claims, 8 Drawing Sheets

Related U.S. Application Data continuation of application No. PCT/CN2020/072055, filed on Jan. 14, 2020.

(56) References Cited

U.S. PATENT DOCUMENTS

| | | | | |
|---|---|---|---|---|
| 2019/0042620 A1* | 2/2019 | Garagiola | ........... | G06F 16/2453 |
| 2019/0149325 A1* | 5/2019 | Garagiola | ............. | H04L 9/3263 |
| | | | | 380/278 |
| 2019/0197532 A1* | 6/2019 | Jayachandran | .... | G06Q 20/3829 |
| 2020/0167503 A1 | 5/2020 | Wei et al. | | |

FOREIGN PATENT DOCUMENTS

| | | |
|---|---|---|
| CN | 107464118 | 12/2017 |
| CN | 108352014 | 7/2018 |
| CN | 108898390 | 11/2018 |
| CN | 109345390 | 2/2019 |
| CN | 109670335 | 4/2019 |
| CN | 109766722 | 5/2019 |
| CN | 110245506 | 9/2019 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Application No. PCT/CN2020/072055, dated Apr. 3, 2020, 14 pages (with partial machine translation).

Arxiv.org, [online] "Ekiden: A Platform for Confidentiality-Preserving, Trustworthy, and Performant Smart Contract Execution," Apr. 2019, retrieved on Apr. 7, 2021, retrieved from URL<https://arxiv.org/abs/1804.05141v6>, 16 pages.

Eprint.iacr.org' [online] "Senopra: Reconciling Data Privacy and Utility via Attested Smart Contract Execution," Dec. 2018, retrieved on Apr. 7, 2021, retrieved from URL<https://eprint.iacr.org/2018/1246.pdf>, 21 pages.

Researchgate.net, [online] "Regerator: a Registry Generator for Blockchain," CaiSE2017: 29th International Conference on AdvancedInformation Systems Engineering, Jun. 2017, retrieved on Apr. 7, 2021, retrieved from UPL<https://www.researchgate.net/publication/318108154_Regerator_a_Registry_Generator_for_Blockchain>, 9 pages.

Yuan et al., "ShadowEth: Private Smart Contract on Public Blockchain," Journal of Computer Science and Technology, May 2018, 33(3): 542-556.

* cited by examiner

MANAGING A SMART CONTRACT ON A BLOCKCHAIN

CROSS-REFERENCE TO RELATED APPLICATIONS

This application is a continuation of and claims the benefit of priority of U.S. patent application Ser. No. 16/777,110, filed Jan. 30, 2020, now U.S. Pat. No. 10,839,107, which is a continuation of PCT Application No. PCT/CN2020/072055, filed on Jan. 14, 2020, which claims priority to Chinese Patent Application No. 201910464790.1, filed on May 30, 2019, each of the foregoing applications being hereby incorporated by reference in its entirety.

TECHNICAL FIELD

One or more embodiments of the present disclosure relate to the technical field of blockchain, and in particular, to a method, an apparatus, and an electronic device for managing a smart contract based on a blockchain.

BACKGROUND

Blockchain technology, also known as distributed ledger technology, is an emerging technology in which several computing devices participate in "book-keeping" and jointly maintain a complete distributed database. Since blockchain technology has the characteristics of decentralization, openness and transparency, each computing device can participate in database records, and data can be quickly synchronized between computing devices, blockchain technology has been widely used in many fields.

SUMMARY

The present disclosure provides a method for managing a smart contract based on a blockchain. The method can be applied to a node device in a blockchain. The node device is installed with a trusted execution environment (TEE). The method includes: in response to an invoking transaction initiated by a client with respect to a target smart contract, obtaining encrypted contract codes of a target smart contract stored in distributed ledgers of the blockchain, and transmitting the encrypted contract codes of the target smart contract to the trusted execution environment; obtaining a smart contract management rule, and determining in the trusted execution environment whether the target smart contract is a managed smart contract based on the smart contract management rule; if the target smart contract is not a managed smart contract, extracting a decryption key which is stored in the trusted execution environment and corresponding to the contract codes of the target smart contract, and based on the extracted decryption key, decrypting the contract codes of the target smart contract; and executing the decrypted contract codes of the target smart contract in the trusted execution environment, encrypting the execution result and transmitting the encrypted execution result to the distributed ledgers of the blockchain for storage.

In some embodiments, the trusted execution environment stores decryption keys corresponding to encrypted contract codes of smart contracts stored in the distributed ledgers of the blockchain. Decryption keys corresponding to managed smart contracts, which are stored in the trusted execution environment, are set as extraction prohibited. In some embodiments, the decryption keys stored in the trusted execution environment do not include the decryption keys corresponding to the managed smart contracts.

In some embodiments, the method further includes: if the target smart contract is a managed smart contract, return a prompt message of failure in invoking the target smart contract to the client.

In some embodiments, the method further includes: receiving a creation transaction initiated by a client with respect to a target smart contract, wherein the creation transaction includes encrypted contract codes of the target smart contract; and in response to the creation transaction, executing smart contract creation codes in the trusted execution environment, creating a contract account corresponding to the target smart contract in the blockchain, and transmitting the encrypted contract codes of the target smart contract to the distributed ledgers of the blockchain for storage.

In some embodiments, obtaining the smart contract management rule includes: obtaining a smart contract management rule from a distributed ledger of a management blockchain, wherein the smart contract management rule is a smart contract management rule generated by a management party invoking a smart contract deployed on the management blockchain.

In some embodiments, the smart contract management rule includes: a smart contract blacklist consisting of contract addresses of managed smart contracts. Determining whether the target smart contract is a managed smart contract based on the smart contract management rule includes: obtaining a contract address of the target smart contract in the invoking transaction; matching the contract address of the target smart contract with the contract addresses in the smart contract blacklist; and if the contract address of the target smart contract matches any one of the contract addresses in the smart contract blacklist, determining that the target smart contract is a managed smart contract; otherwise, determining that the target smart contract is not a managed smart contract.

In some embodiments, the encryption method applied for the contract codes of the target smart contract includes any one of the following encryption methods: a symmetric encryption method, an asymmetric encryption method, or a symmetric encryption method combined with an asymmetric encryption method. The encryption method applied for the execution result of the contract codes of the target smart contract includes: a symmetric encryption method, or an asymmetric encryption method.

In some embodiments, the symmetric encryption method combined with the asymmetric encryption method includes a digital envelope encryption method.

In some embodiments, the trusted execution environment includes Intel Software Guard Extensions (SGX).

The present disclosure also provides an apparatus for managing a smart contract based on a blockchain. The apparatus can be applied to a node device in a blockchain. The node device being installed with a trusted execution environment. The apparatus includes: an obtaining module configured to, in response to an invoking transaction initiated by a client with respect to a target smart contract, obtain encrypted contract codes of a target smart contract stored in distributed ledgers of the blockchain, and transmit the encrypted contract codes of the target smart contract to the trusted execution environment; a determining module configured to obtain a smart contract management rule, and determine in the trusted execution environment whether the target smart contract is a managed smart contract based on the smart contract management rule; a decrypting module configured to, if the target smart contract is not a managed smart contract, extract a decryption key which is stored in the trusted execution environment and corresponding to the contract codes of the target smart contract, and based on the extracted decryption key, decrypt the contract codes of the target smart contract; and an executing module configured to execute the decrypted contract codes of the target smart contract in the trusted execution environment, encrypt the execution result and transmit the encrypted execution result to the distributed ledgers of the blockchain for storage.

In some embodiments, the trusted execution environment stores decryption keys corresponding to encrypted contract codes of smart contracts stored in the distributed ledgers of the blockchain. Decryption keys corresponding to managed smart contracts, which are stored in the trusted execution environment, are set as extraction prohibited. In some embodiments, the decryption keys stored in the trusted execution environment do not include the decryption keys corresponding to the managed smart contracts.

In some embodiments, the apparatus further includes: a returning module configured to, if the target smart contract is a managed smart contract, return a prompt message of failure in invoking the target smart contract to the client.

In some embodiments, the apparatus further includes: a receiving module configured to receive a creation transaction initiated by a client with respect to a target smart contract; wherein the creation transaction includes encrypted contract codes of the target smart contract; and a creating module configured to, in response to the creation transaction, execute smart contract creation codes in the trusted execution environment, create a contract account corresponding to the target smart contract in the blockchain, and transmit the encrypted contract codes of the target smart contract to the distributed ledgers of the blockchain for storage.

In some embodiments, the obtaining module is configured to: obtain a smart contract management rule from a distributed ledger of a management blockchain; where the smart contract management rule is a smart contract management rule generated by a management party invoking a smart contract deployed on the management blockchain.

In some embodiments, the smart contract management rule includes: a smart contract blacklist consisting of contract addresses of managed smart contracts. The determining module is configured to: obtain a contract address of the target smart contract in the invoking transaction; match the contract address of the target smart contract with the contract addresses in the smart contract blacklist; and if the contract address of the target smart contract matches any one of the contract addresses in the smart contract blacklist, determine that the target smart contract is a managed smart contract; otherwise, determine that the target smart contract is not a managed smart contract.

In some embodiments, the encryption method applied for the contract codes of the target smart contract includes any one of the following encryption methods: a symmetric encryption method, an asymmetric encryption method, or a symmetric encryption method combined with an asymmetric encryption method. The encryption method applied for the execution result of the contract codes of the target smart contract includes: a symmetric encryption method, or an asymmetric encryption method.

In some embodiments, the symmetric encryption method combined with the asymmetric encryption method includes a digital envelope encryption method.

In some embodiments, the trusted execution environment includes Intel SGX.

The present disclosure also provides a method for managing a smart contract based on a blockchain. The method can be applied to a node device in a blockchain. The node device is installed with a trusted execution environment. The trusted execution environment stores decryption keys corresponding to encrypted contract codes of smart contracts stored in distributed ledgers of the blockchain. The method includes: in response to an invoking transaction initiated by a client with respect to a target smart contract, obtaining encrypted contract codes of a target smart contract stored in the distributed ledgers of the blockchain, and transmitting the encrypted contract codes of the target smart contract to the trusted execution environment; extracting a decryption key which is stored in the trusted execution environment and corresponding to the contract codes of the target smart contract, and decrypting the contract codes of the target smart contract based on the extracted decryption key; executing the decrypted contract codes of the target smart contract in the trusted execution environment; and obtaining a smart contract management rule, and determining whether the target smart contract is a managed smart contract based on the smart contract management rule in a trusted execution environment; if the target smart contract is not a managed smart contract, encrypting the execution result of the contract codes of the target smart contract and transmitting the encrypted execution result to the distributed ledgers of the blockchain for storage.

In some embodiments, the method further includes: if the target smart contract is a managed smart contract, deleting the execution result of the contract codes of the target smart contract, and returning a prompt message of failure in invoking the target smart contract to the client; or if the target smart contract is a managed smart contract, storing the execution result of the contract codes of the target smart contract in the trusted execution environment, setting the execution result stored in the trusted execution environment as extraction prohibited; and returning a prompt message of failure in invoking the target smart contract to the client.

The present disclosure also provides an apparatus for managing a smart contract based on a blockchain. The apparatus can be applied to a node device in a blockchain. The node device is installed with a trusted execution environment. The trusted execution environment storing decryption keys corresponding to encrypted contract codes of smart contracts stored in distributed ledgers of the blockchain. The apparatus including: a second obtaining module configured to, in response to an invoking transaction initiated by a client with respect to a target smart contract, obtain encrypted contract codes of a target smart contract stored in the distributed ledgers of the blockchain, and transmit the encrypted contract codes of the target smart contract to the trusted execution environment; a first decryption module configured to extract a decryption key which is stored in the trusted execution environment and corresponding to the contract codes of the target smart contract, and decrypt the contract codes of the target smart contract based on the extracted decryption key; a second executing module configured to execute the decrypted contract codes of the target smart contract in the trusted execution environment; and a second determining module configured to obtain a smart contract management rule, and determine whether the target smart contract is a managed smart contract based on the smart contract management rule in a trusted execution environment; if the target smart contract is not a managed smart contract, encrypt the execution result of the contract codes of the target smart contract and transmit the encrypted execution result to the distributed ledgers of the blockchain for storage.

In some embodiments, the apparatus further includes: a second returning module configured to, if the target smart contract is a managed smart contract, delete the execution result of the contract codes of the target smart contract, and return a prompt message of failure in invoking the target smart contract to the client; or if the target smart contract is a managed smart contract, store the execution result of the contract codes of the target smart contract in the trusted execution environment, set the execution result stored in the trusted execution environment as extraction prohibited; and return a prompt message of failure in invoking the target smart contract to the client.

In the above technical solution, when the node device in the blockchain executes the encrypted contract codes of a smart contract in the trusted execution environment, contract codes of an unmanaged smart contract can be decrypted and executed. On the basis of adequate privacy protection of smart contracts, the content of some managed smart contracts can be shielded through technical means to achieve regulatory of smart contracts.

DETAILED DESCRIPTION OF THE EMBODIMENTS

Figure 1:
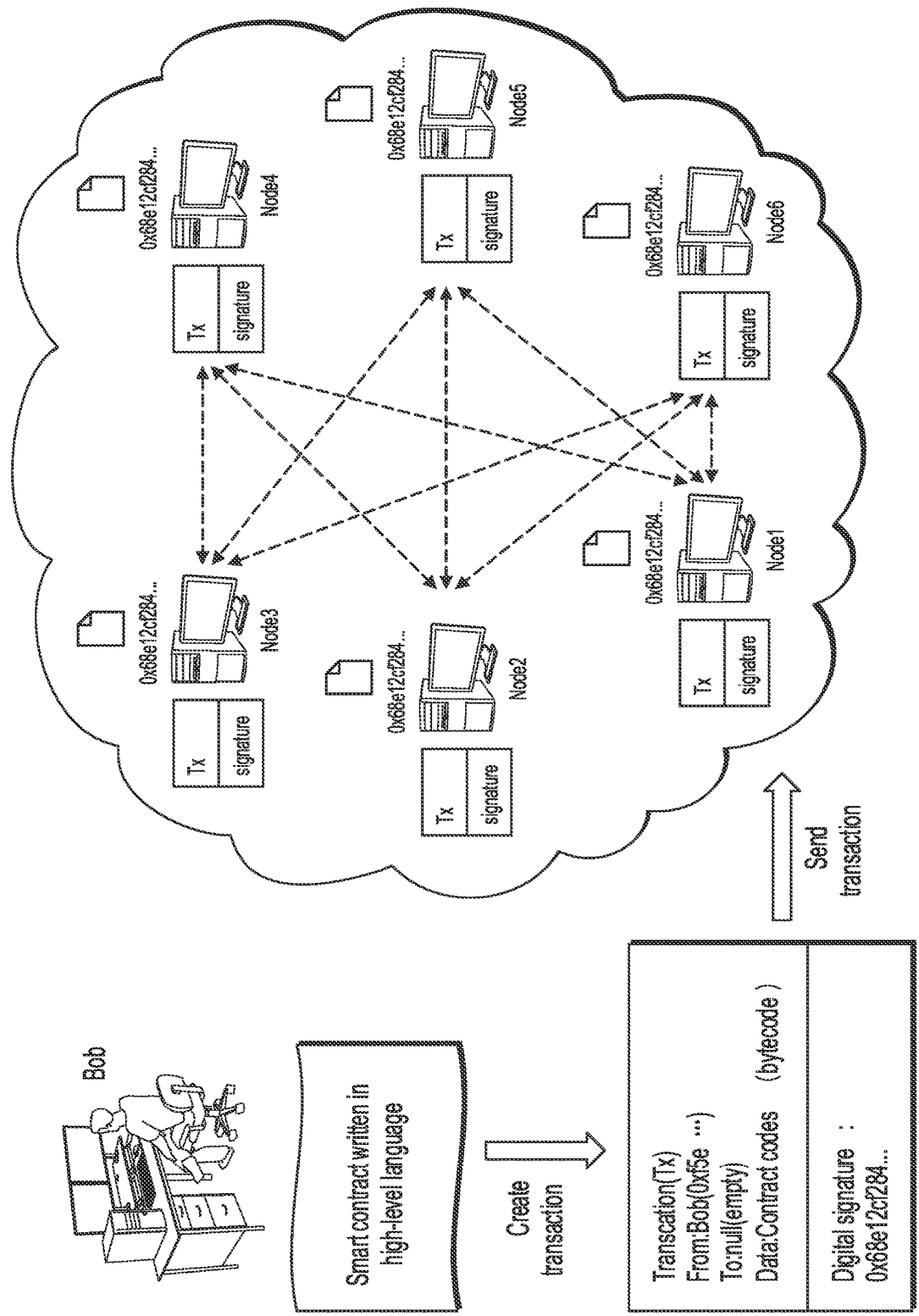
FIG. 1 is a schematic diagram illustrating creating a smart contract according to an embodiment of the present disclosure.

Examples of embodiments will be described in detail here, examples of which are illustrated in the accompanying drawings. When the following description refers to the accompanying drawings, the same numerals in different drawings represent the same or similar elements unless otherwise indicated. The embodiments described in the following examples do not represent all embodiments consistent with one or more embodiments of the present disclosure. Rather, they are merely examples of apparatuses and methods consistent with some aspects of one or more embodiments of the present disclosure, as detailed in the appended claims.

It should be noted that, in other embodiments, the steps of the corresponding method are not necessarily performed in the order shown and described in the present disclosure. In some other embodiments, the method can include more or fewer steps than described in the present disclosure. In addition, a single step described in the present disclosure can be divided into multiple steps for description in other embodiments; and multiple steps described in the present disclosure can be combined into a single step for other embodiments.

Blockchains are generally divided into three types: public blockchains, private blockchains, and consortium blockchains. In addition, there can be combinations of the above types, such as private blockchain+consortium blockchain, consortium blockchain+public blockchain, etc. Here, the most decentralized is the public blockchain. The public blockchain is represented by Bitcoin and Ethereum. Participants joining the public blockchain can read data records on the chain, participate in transactions, and compete for the book-keeping right for latest blocks. Moreover, each participant (i.e. node) can freely join and leave the network and perform related operations. On the contrary, for the private blockchain, the write permission of the network is controlled by an organization or institution, and the data read permission is regulated by the organization. In simple terms, a private blockchain can be a weakly centralized system with strict restrictions on participating nodes and having a small number of nodes. This type of blockchain is more suitable for internal use by specific institutions.

The consortium blockchain is a blockchain between the public blockchains and the private blockchains, which can achieve "partial decentralization". Each node in the consortium blockchain usually has a corresponding entity or organization; participants are authorized to join the network and form a stakeholder alliance to jointly maintain the operation of the blockchain.

Whether it is a public, private or consortium chain, it is possible to provide the function of a smart contract. A smart contract on the blockchain is a contract that can be triggered by transactions on the blockchain system. Smart contracts can be defined in the form of code.

Taking Ethereum as an example, Ethereum supports users to create and invoke some complex logic in the Ethereum network. It is a challenge that Ethereum is different from Bitcoin blockchain technology. Ethereum is a programmable blockchain, and its core is the Ethereum Virtual Machine (EVM). Each Ethereum node can run EVM. EVM is a Turing-complete virtual machine, through which a variety of complex logic can be implemented. Users issuing and invoking smart contracts in Ethereum are run on EVM. In fact, the Virtual Machine directly runs virtual machine code (virtual machine bytecode, hereinafter referred to as "bytecode"), so smart contracts deployed on the blockchain can be a form of bytecode.

As shown in FIG. 1, after Bob sends a transaction containing the information to create a smart contract to the Ethereum network, the EVM of node 1 can execute this transaction and generate a corresponding smart contract instance. "0x68e12cf284 . . . " in FIG. 1 in the figure represents the address of the contract. The data field of the transaction can be stored as a bytecode, and the to field of the transaction is an empty account. After the nodes reach a consensus through the consensus mechanism, this smart contract is successfully created, and subsequent users can invoke this smart contract.

After the smart contract is created, a smart contract account corresponding to the smart contract appears on the blockchain and has an address. The smart contract codes and account storage will be stored in the smart contract account. The action of the smart contract is controlled by the contract codes, and the account storage of the smart contract saves the state of the smart contract. In other words, a smart contract causes a virtual account containing smart contract codes and account storage to be generated on the blockchain.

As mentioned earlier, the data field of the transaction that contains the creation of a smart contract can store the bytecode of the smart contract. Bytecode consists of a series of bytes, and each byte can identify an operation. Based on multiple factors such as development efficiency and readability, developers can choose not to write bytecode directly, but choose a high-level language to write smart contract codes. For example, high-level languages such as Solidity, Serpent, and LLL are used. For smart contract codes written in a high-level language, it can be compiled by a compiler to generate bytecode that can be deployed on the blockchain.

Taking the Solidity language as an example, the smart contract codes written in Solidity is similar to the classes in the object-oriented programming language. In a smart contract, multiple members can be declared, including state variables, functions, function modifiers, events, and so on. A state variable is a value that is permanently stored in the Account Storage field of the smart contract and is used to save the state of the smart contract.

Generally, when a smart contract is deployed on the blockchain, the storage state corresponding to the state variables in the contract codes of the smart contract is plaintext which is visible to anyone, without privacy settings and capabilities.

Figure 2:
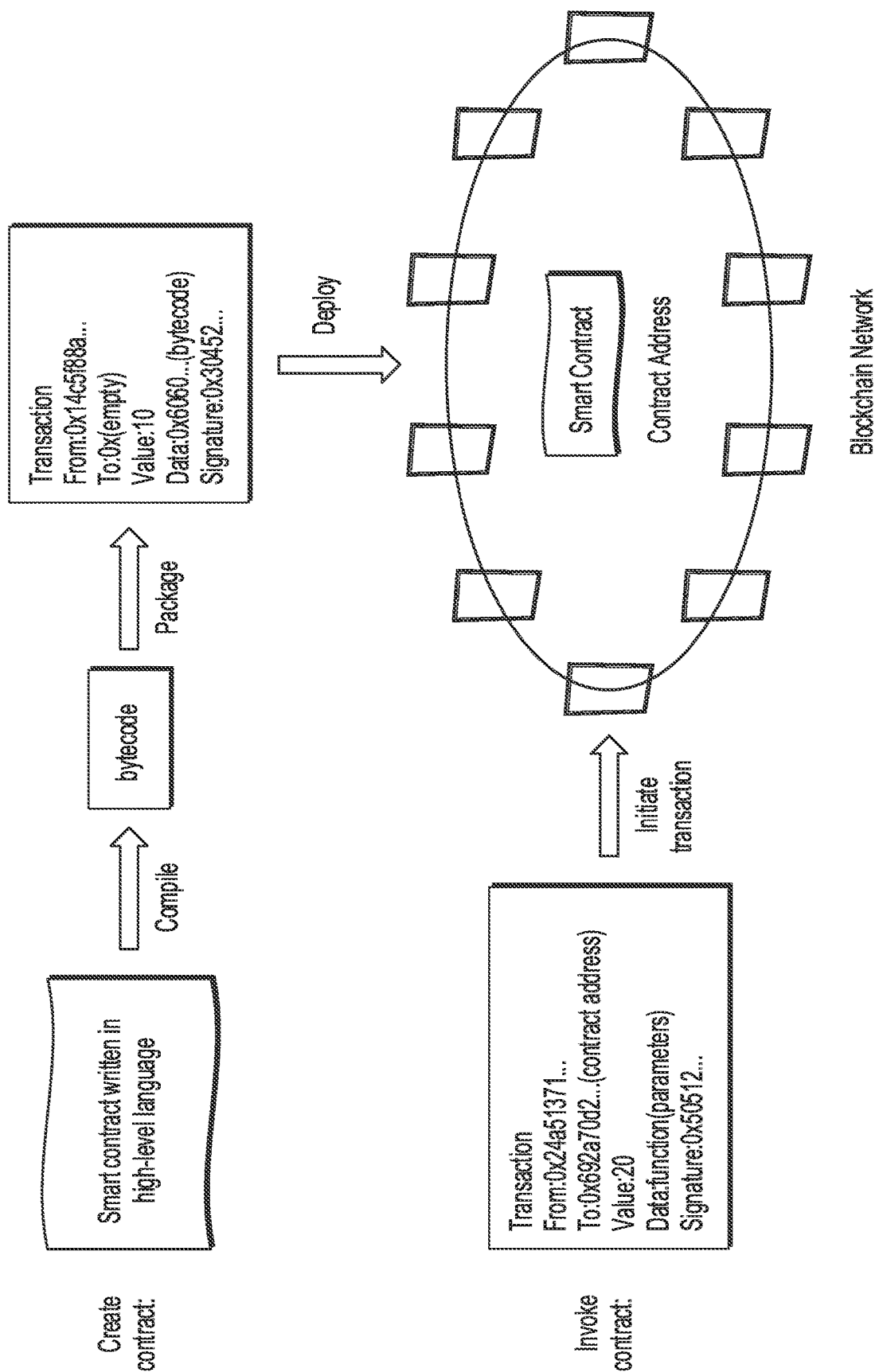
FIG. 2 is a schematic diagram illustrating invoking a smart contract according to an embodiment of the present disclosure.

As shown in FIG. 2, still taking Ethereum as an example, after Bob sends a transaction containing information about invoking a smart contract to the Ethereum network, the EVM of node 1 can execute the transaction and generate a corresponding smart contract instance. The from field of the transaction in FIG. 2 is the address of the account that initiated the invoke of the smart contract. The "0x692a-70d2 . . . " in the to field represents the address of the invoked smart contract. The value field is the value of the ether in Ethereum. The data field stores the method and parameter for invoking the smart contract. After the smart contract is invoked, the value of balance can change. Subsequently, a client can view the current value of balance through a blockchain node (such as node 6 in FIG. 2).

The smart contract can be independently executed by each node in the blockchain network in a prescribed manner, and all execution records and data are stored on the blockchain, so after such transaction is completed, transaction credentials that cannot be tampered with and will not be lost are stored on the blockchain.

Figure 3:
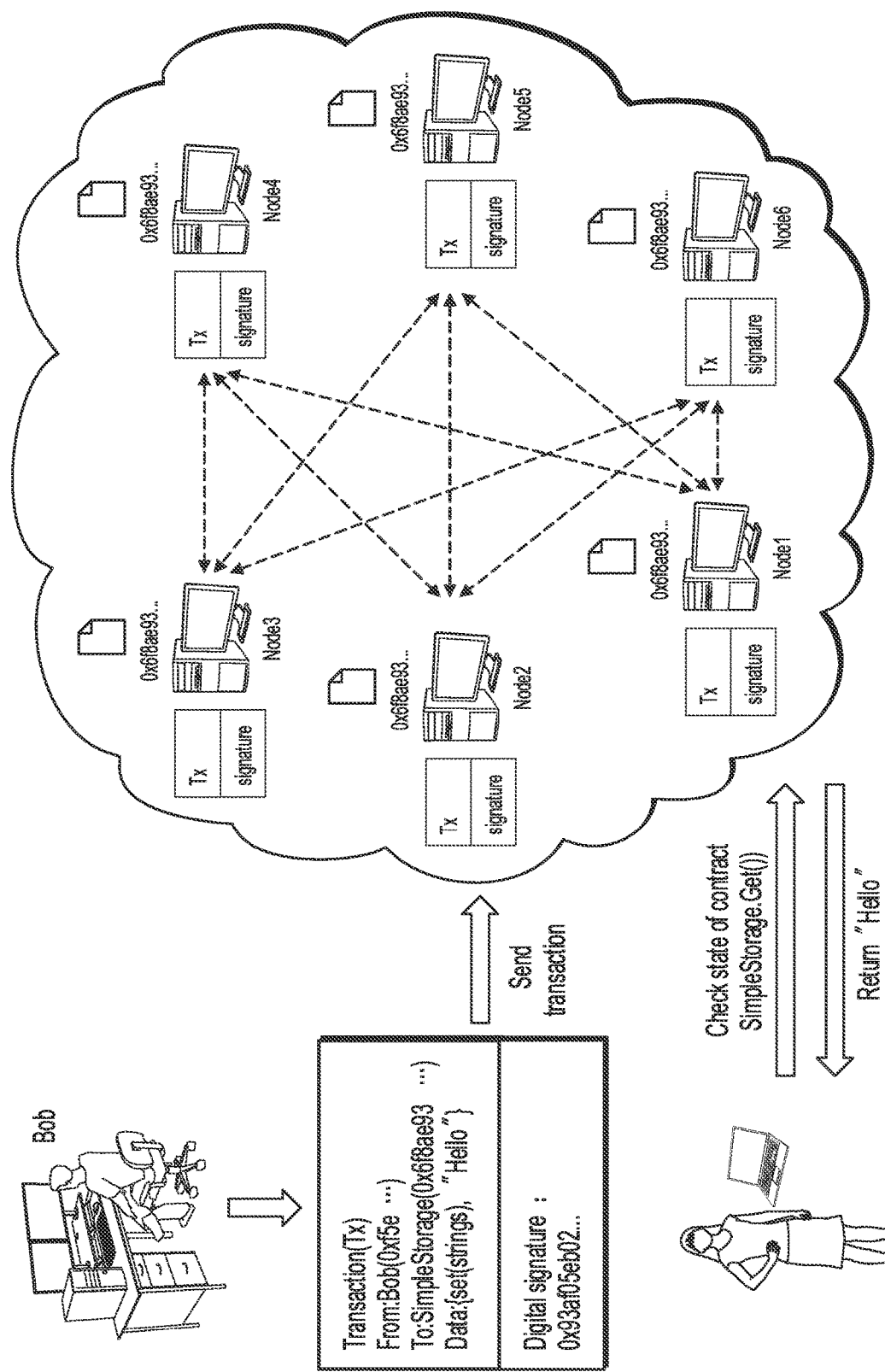
FIG. 3 is a schematic diagram illustrating creating a smart contract and invoking a smart contract according to an embodiment of the present disclosure.

The diagram of creating a smart contract and invoking a smart contract is shown in FIG. 3. To create a smart contract in Ethereum, it may go through the processes of writing a smart contract, turning the smart contract into bytecodes, and deploying the bytecodes to the blockchain. Invoking a smart contract in Ethereum is to initiate a transaction that points to the address of the smart contract. The EVM of each node can execute the transaction separately, and the smart contract codes are distributed to be run in the virtual machine of each node in the Ethereum network.

At present, the two technical challenges of enterprise-level blockchain platforms are privacy and performance. Often these two challenges are difficult to be solved at the same time. Most of the solutions are to sacrifice performance in exchange for privacy, or to pursue performance without much consideration of privacy. Common encryption technologies that solve privacy issues, such as Homomorphic encryption and Zero-knowledge proof, have high complexity, poor generality, and can also cause serious performance losses.

In terms of privacy, Trusted Execution Environment (TEE) is another solution. TEE can function as a black box in hardware. The codes executed in the TEE and the data operating system layer cannot be snooped, and can be manipulated through a predefined interface in the codes.

In terms of efficiency, due to the black box nature of TEE, the operations performed in TEE are plaintext data, not the complex cryptographic operations in homomorphic encryption. There can be no loss in the efficiency of the calculation process, so the combination with TEE can improve the security and privacy of the blockchain while reducing the performance loss. At present, the industry is paying close attention to TEE solutions, and almost all major chips and software alliances have their own TEE solutions, including TPM (Trusted Platform Module) in software aspect and Intel SGX (Software Protection Extension), ARM Trustzone and AMD PSP (Platform Security Processor) in hardware aspect.

In the traditional solution combining the blockchain and TEE, in order to achieve privacy protection, the entire smart contract is taken as data requiring privacy protection to be invoked and executed in TEE, and the entire contract state is encrypted and stored on the blockchain. In this way, although the security level of privacy protection can be improved to some extent, it also causes difficulties in data management.

For example, in a management scenario shown, as a regulating party of a smart contract, there can be a demand to regulate content of the execution process and the corresponding execution result of the contract codes of the smart contract. In the combined solution of TEE, the security level of smart contract execution is relatively high, and the execution process and execution result of the smart contract are in an invisible privacy state. Therefore, this makes it difficult to regulate the content of the smart contract.

The present disclosure aims to provide a technical solution for the effective management of smart contracts on the basis of adequate privacy protection of smart contracts in an application scenario where the blockchain and TEE are combined.

In an embodiment, the contract codes of the smart contract deployed on the blockchain can be encrypted and persistently stored in the distributed ledgers of the blockchain. In a trusted execution environment equipped with a node device in the blockchain, a decryption key corresponding to the encrypted contract codes of the smart contract stored in the distributed ledgers of the blockchain can be stored in advance.

For example, taking the scenario of smart contract content regulatory as an example, in one embodiment, the decryption keys stored in the trusted execution environment can include the decryption keys corresponding to those regulated smart contracts. That is, in the trusted execution environment, the decryption keys corresponding to the unregulated smart contracts can be stored, and the decryption keys of those regulated smart contracts are not stored.

In another embodiment, in the trusted execution environment, the decryption keys corresponding to smart contracts can be stored by default. The decrypted keys corresponding to the regulated smart contracts, which are stored in the trusted execution environment, are set as extraction prohibited. That is, decryption keys corresponding to contract codes of non-regulated smart contracts can be extracted normally.

When the node device receives the invoking transaction initiated by the client with respect to the target smart contract, the node device can obtain the encrypted smart contract codes of the target smart contract stored in the distributed ledgers of the blockchain, and will transmit the encrypted smart contract codes of the target smart contract obtained to the trusted execution environment installed of the node device.

After transmitting the encrypted smart contract codes of the target smart contract to the trusted execution environment installed on the node device, the node device can obtain a smart contract management rule, and in the trusted execution environment and based on the obtained smart contract management rule, determine whether the target smart contract is a managed smart contract.

If it is confirmed that the target smart contract is not a managed smart contract, the node device can extract the decryption key stored in the trusted execution environment and corresponding to the smart contract codes of the target smart contract, and decrypt the smart contract codes of the target smart contract.

After obtaining the plaintext smart contract codes of the target smart contract from decryption, the node device can execute the decrypted plaintext smart contract codes in the trusted execution environment, and then encrypt the execution result and transmit the encrypted execution result to the blockchain's distributed ledger for storage.

In the above technical solution, when the node device in the blockchain executes the encrypted smart contract codes of a smart contract in the trusted execution environment, contract codes of an unmanaged smart contract can be decrypted and executed. On the basis of adequate privacy protection of smart contracts, the content of some managed smart contracts can be shielded through technical means to achieve regulatory of smart contracts.

Figure 4:
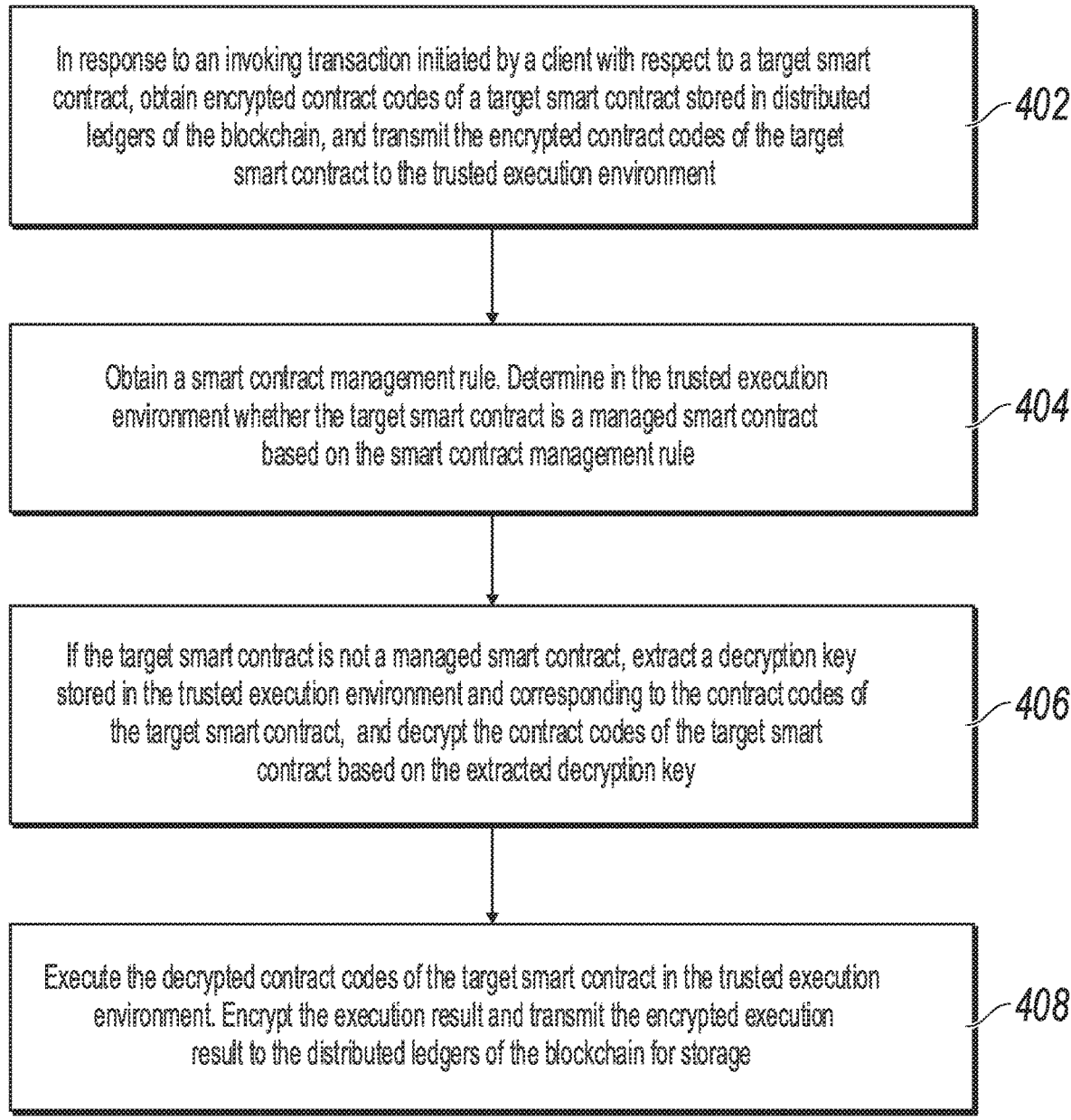
FIG. 4 is a flowchart illustrating a method for managing a smart contract based on a blockchain according to an embodiment of the present disclosure.

Referring to FIG. 4, which is a flowchart of a method for managing a smart contract based on a blockchain according to an example of an embodiment. As shown in FIG. 4, the method is applied to a node device in a blockchain. The node device is installed with a trusted execution environment. The method includes the following steps.

At step 402, in response to an invoking transaction initiated by a client with respect to a target smart contract, encrypted contract codes of the target smart contract stored in distributed ledgers of the blockchain are obtained, and the encrypted contract codes of the target smart contract are transmitted to the trusted execution environment.

At step 404, a smart contract management rule is obtained. In the trusted execution environment, it is determined whether the target smart contract is a managed smart contract based on the smart contract management rule.

At step 406, if the target smart contract is not a managed smart contract, a decryption key stored in the trusted execution environment and corresponding to the contract codes of the target smart contract, is extracted, and the contract codes of the target smart contract are decrypted based on the extracted decryption key.

At step 408, the decrypted contract codes of the target smart contract are executed in the trusted execution environment. The execution result is encrypted and transmitted to the distributed ledgers of the blockchain for storage.

In the present disclosure, the management of a smart contract can refer to management by a management party of the smart contract with respect to the execution process of the smart contract codes of the smart contract and the corresponding execution result.

For example, in a management scenario shown, managing a smart contract can refer to regulating the execution process of the contract codes of the smart contracts and the corresponding execution result. In this management scenario, correspondingly, the management party can also refer to the regulating party of the smart contract.

The technical solution of the present disclosure will be described in detail below in conjunction with the management scenario for smart contract regulatory. In this scenario, the managed smart contract is the regulated smart contract, the smart contract management rule is a smart contract regulatory rule. In the present disclosure, after the user has written the smart contract codes of a smart contract, based on the smart contract codes of the smart contract, a user can construct a creation transaction for creating a smart contract on the client and transmit the transaction to the blockchain node device interlinked with the client.

For example, in an embodiment, if a user writes the smart contract codes of a smart contract in a high-level language, the client can further compile the smart contract codes through a compiler to generate bytecodes that can be deployed on the blockchain, and then based on the bytecodes of the smart contract generated from compiling, generate a creation transaction by "packaging" for creating a smart contract, and transmit the transaction to the blockchain node device interlinked with the client.

It should be noted that, to ensure the privacy of the contract codes written by the user, the client can use the key to encrypt the smart contract codes written.

For example, in an embodiment, the client can directly encrypt the constructed creation transaction as a whole. In some embodiments, the client can encrypt the bytecodes per se of the smart contract carried in the constructed creation transaction. The encryption method can be flexibly selected when those skilled in the art practice the technical solutions disclosed in the present disclosure.

The encryption method applied when encrypting the contract codes can be symmetric encryption or asymmetric encryption.

For example, the encryption algorithm used for symmetric encryption can be Data Encryption Standard (DES) algorithm, 3DES algorithm, Triple Data Encryption Algorithm (TDEA) algorithm, Blowfish algorithm, Rivest Cipher 5 (RCS) algorithm, International Data Encryption Algorithm (IDEA) algorithm, etc. The encryption algorithm used for asymmetric encryption can be Rivest-Shamir-Adleman (RSA), Elgamal, backpack algorithm, Rabin, D-H (Diffie-Hellman key exchange), ECC (Elliptic Curve Encryption Algorithm), etc.

In addition, the encryption method applied to encrypt the smart contract codes can also be a combination of symmetric encryption and asymmetric encryption. This encryption method is generally called Digital Envelope encryption method.

For example, the client uses a symmetric encryption algorithm to encrypt the smart contract codes, that is, to encrypt the smart contract codes with a private key of the symmetric encryption algorithm, and then encrypt the private key used in the symmetric encryption algorithm with a public key of an asymmetric encryption algorithm. That is, first, the key of the symmetric encryption algorithm is used to encrypt the smart contract codes; and then the key of the asymmetric encryption algorithm is used to further encrypt the key used to encrypt the smart contract codes.

Upon receiving the creation transaction transmitted by the client, the node device in the blockchain can check whether the transaction is valid and whether the format is correct, and verify whether the signature of the transaction is valid, etc. After all checks and verifications have been passed, the creation transaction can be executed in the trusted execution environment to complete the creation of a smart contract.

In some embodiments, before executing the creation transaction in the trusted execution environment, the function type of the transaction can be confirmed first.

For example, taking Ethereum as an example, the function type of a transaction is usually determined based on the transaction content carried in the transaction. For example, if the to field in the transaction is an empty account and the data field of the transaction carries the bytecodes that need to be deployed, the transaction can be considered as a transaction used to create a smart contract. If the to field in the transaction points to a contract address of an existing smart contract, and the data field of the transaction carries the parameters required to invoke the smart contract, it can be determined this transaction is a transaction used to invoke a smart contract.

When it is confirmed that the transaction is a creation transaction for creating a smart contract, the creation codes of a smart contract can be further executed in the trusted security environment, a smart contract account corresponding to the smart contract is created on the blockchain, and the encrypted smart contract codes of the smart contract in the creation transaction are transmitted to the distributed ledgers of the blockchain for storage.

For example, taking Ethereum as an example, the created smart contract account usually includes attribute fields such as Balance, Nonce, codehash, and storaghash. After the node device completes the creation of the smart contract account, the node device will fill the hash value of the smart contract codes in the creation transaction to the codehash field, and the creation transaction is packaged to a block and transmits it to other node devices in the blockchain, and stores it in distributed ledgers of the blockchain. That is, the original content of the contract codes of the smart contract is still stored in the original creation transaction and stored in the block of the blockchain. In the contract account corresponding to the smart contract, a hash pointer to the contract codes of the smart contract can be maintained.

In general, the consensus algorithms supported in the blockchain are usually divided into consensus algorithms in which the node device needs to compete for the record keeping right of each round of record keeping cycle, and consensus algorithms in which the record keeping node is selected in advance for each round of record keeping cycle (no need to compete for the record keeping right).

For example, the former is represented by consensus algorithms such as Proof of Work (POW), Proof of Stake (POS), and Delegated Proof of Stake (DPOS); and the latter is represented by Practical Byzantine Fault Tolerance (PBFT) and other consensus algorithms.

In a blockchain network that supports a smart contract and applies consensus algorithms such as Proof of Work (POW), Proof of Stake (POS), and Delegated Proof of Stake (DPOS) and other consensus algorithms, all of the node devices that compete for the book-keeping right can execute a creation transaction upon receiving the transaction. One of the nodes competing for the book-keeping right may win in the current round of contention for the book-keeping right and become the book-keeping node. The book-keeping node can package the received creation transaction with other transactions to generate a new block, and transmit the generated new block to other nodes for consensus.

In a blockchain network that supports a smart contract and applies the consensus algorithm such as Practical Byzantine Fault Tolerance (PBFT), the node device having the book-keeping right has been agreed on before the current round of book-keeping. Therefore, upon receiving the creation transaction, a node device, if the node device is not the book-keeping node of the current round, can transmit the creation transaction to the book-keeping node. The book-keeping node of the current round can execute the creation transaction during or before the creation transaction is packaged with other transactions to generate the new block. After the book-keeping node packages the creation transaction and other transactions to generate the new block, the book-keeping node can transmit the generated new block or the block header of the new block to other node devices for consensus.

As previously described, no matter which consensus algorithm is applied by the blockchain, the book-keeping node of the current round can package the creation transaction to generate a new block, and the generated new block or the block header of the new block is transmitted to other node devices for consensus verification. If other node devices receive the new block or the block header, and it is verified that there is no problem, the new block can be added to the end of the original blockchain to complete the book-keeping process and reach consensus. After consensus is reached, the deployment of the smart contract on the blockchain is also completed. In the process of verifying a new block or a block header transmitted by the book-keeping node, other node devices can also execute the creation transaction contained in the block.

In the present disclosure, the process of the creation transaction in the trusted execution environment can be performed by a virtual machine deployed in the trusted execution environment. That is, the virtual machine deployed in the trusted execution environment is the entity performing the creation transaction. For example, taking Ethereum as an example, a node device usually executes a transaction through an installed Ethereum Virtual Machine (EVM).

In the present disclosure, after the deployment of the smart contract is completed on the blockchain, the user can construct an invoking transaction on the client for invoking the target smart contract, and transmit the transaction to a blockchain node device interlinked with the client, to initiate the invoking and execution of the target smart contract that has been deployed.

Upon receiving the invoking transaction transmitted by the client, the node device in the blockchain can still check whether the transaction is valid and whether the format is correct, and verify whether the signature of the transaction is valid, etc. After all checks and verifications have been passed, the invoking transaction is executed in the trusted execution environment.

In some embodiments, before executing the invoking transaction in the trusted execution environment, the function type of the transaction can also be confirmed first. When the transaction is confirmed as an invoking transaction for invoking a smart contract, encrypted smart contract codes of the target smart contract stored in the distributed ledgers of the blockchain can be further obtained. The obtained encrypted smart contract codes of the target smart contract are transmitted to the trusted execution environment for execution in the trusted execution environment.

In the present disclosure, in the trusted execution environment, a decryption key corresponding to the encrypted smart contract codes of the smart contract stored in the distributed ledgers of the blockchain can be stored and maintained. For example, in an embodiment, the trusted execution environment can be installed with a key generation algorithm. When a user creates a contract account corresponding to a smart contract on the blockchain, the node device can invoke the installed key generation algorithm to create a root key for the contract account in the trusted execution environment.

If asymmetric encryption is applied, the root key includes a public-private key pair. The public key is used to encrypt the contract codes and is held by the user. The private key is stored in a trusted execution environment and used to encrypt the encrypted contract codes. If symmetric encryption is applied, the root key includes one key used to encrypt and decrypt the contract codes.

The types of the key generation algorithm and the embodiment process of creating a root key based on the key generation algorithm will not be described in detail in the present disclosure.

In an embodiment shown, in order to achieve regulatory of smart contracts, in the trusted execution environment, the decryption keys corresponding to the contract codes of all smart contracts included in the distributed ledgers of the blockchain can be stored by default. In order to achieve the purpose of regulatory, the decryption keys corresponding to the regulated smart contracts, which are stored in the trusted execution environment, can be set to a state in which extraction is prohibited.

The embodiment for setting the decryption key corresponding to the contract codes of the regulated smart contract stored and maintained in the trusted execution environment to an un-extractable state is not limited in the present disclosure;

For example, in one embodiment as shown, program codes for controlling extraction permission of the decryption key can be deployed in a trusted execution environment, and the program codes can be independently invoked and executed by hardware carrying the trusted execution environment (for example, a chip as a trusted execution environment). Further, the trusted execution environment can control the extraction permission of the decryption key stored and maintained by executing the program codes to ensure the decryption key corresponding to the contract codes of the regulated smart contract stored and maintained in the trusted execution environment is in a state that cannot be extracted and exported. Of course, in addition to the embodiment as shown above, it can also be implemented by other embodiments, which are not listed one by one in the present disclosure.

After transmitting the obtained encrypted smart contract codes of the target smart contract to the trusted execution environment, the hardware carrying the trusted execution environment can further obtain the smart contract regulatory rule, and in the trusted execution environment, it is determined whether the target smart contract is a regulated smart contract based on the obtained smart contract regulatory rule.

The smart contract regulatory rule can be regulatory rule that is independently generated by the regulating party and can be updated and modified in real time by the regulating party.

In an embodiment as shown, on the basis of the blockchain described above, an independent regulatory blockchain can be deployed, a smart contact for generating smart contract regulatory rule can be deployed on the regulatory blockchain, and generation logic for the generating smart contract regulatory rule is declared in the smart contract. In addition, the regulating party can construct an invoking transaction based on the actual regulatory requirements to invoke the smart contract, dynamically generate the smart contract regulatory rule, and store the generated smart contract regulatory rule in the distributed ledgers of the regulatory blockchain.

The dynamic generation of smart contract regulatory rule refers to the smart contract regulatory rule actually used when regulating smart contracts, and the latest generated smart contract regulatory rule always prevails. If the regulatory requirements of the regulating party change, the regulating party can invoke the smart contract to regenerate new smart contract regulatory rule based on the new regulatory requirements.

In this way, the regulating party can flexibly and dynamically update the smart contract regulatory rule based on the actual regulatory requirements.

For example, the smart contract regulatory rule can be a smart contract blacklist consisting of contract addresses of regulated smart contracts. When the regulating party updates the contract addresses of the regulated smart contracts in the smart contract blacklist, the regulating party can regenerate a smart contract blacklist by invoking the smart contract, as described above. Thus, the contract addresses of the regulated smart contract in the smart contract blacklist can be deleted or added flexibly.

Correspondingly, when the hardware carrying the trusted execution environment is obtaining the smart contract regulatory rule, the hardware can access the distributed ledgers of the regulatory blockchain and obtain the latest smart contract regulatory rule from the distributed ledgers of the regulatory blockchain.

For example, in an embodiment, the smart contract regulatory rule generated after invoking the smart contracts deployed in the regulatory blockchain can be stored in the state database of the regulatory blockchain. For example, taking Ethereum as an example, the invoking result of the smart contract can be stored in the receipt tree in the state database of the blockchain as part of the transaction receipt of the invoking transaction for the current invoking. The node device can monitor data related to the smart contract stored in the state database of the regulatory blockchain in real time. When the latest smart contract regulatory rule generated by invoking the smart contract is monitored, the smart contract regulatory rule can be stored locally. The hardware carrying the trusted execution environment can directly read the latest smart contract regulatory rule from the local node device.

The form of the smart contract regulatory rule is not limited in the present disclosure; for example, it can be a smart contract blacklist consisting of contract addresses of the regulated smart contracts, or other forms other than the blacklist.

In one embodiment as shown, taking the smart contract regulatory rule being a smart contract blacklist consisting of contract addresses of regulated smart contracts as an example. In this case, when the hardware carrying the trusted execution environment determines whether the target smart contract is a regulated smart contract based on the latest smart contract regulatory rule obtained, the hardware can first obtain the contract address of the target smart contract carried in the invoking transaction, and match the contract address of the target smart contract with the contract addresses of the regulated smart contracts in the blacklist.

In the present disclosure, the contract address is the account address of the contract account created for the smart contract. For example, taking Ethereum as an example, the address of the smart contract account is generated by the encryption algorithm from the address of the sender (such as 0xf5e . . . in FIG. 1) and a transaction random number (nonce) as input.

If the smart contract address of the target smart contract matches a smart contract address of any regulated smart contract in the blacklist, it can be determined that the target smart contract is a regulated smart contract. Otherwise, if the smart contract address of the target smart contract does not match any smart contract address in the blacklist, it can be determined that the target smart contract is not a regulated smart contract.

It should be noted that when the smart contract regulatory rule is other forms of regulatory rule than the smart contract blacklist, when determining whether the target smart contract is a regulated smart contract based on the latest smart contract regulatory rule obtained, the determining method can also change accordingly, and may not be listed one by one in the present disclosure.

For example, in one case, the smart contract regulatory rule can also be the encoding method of the smart contract address of the regulated smart contract. That is, the smart contract regulatory rule can be used to regulate a type of smart contract having a smart contract address meets an encoding method. In this case, when determining whether the target smart contract is a regulated smart contract based on the latest smart contract regulatory rule obtained, it is determined whether the encoding method of the smart contract address of the target smart contract matches the agreed encoding method in the smart contract regulatory rule.

In one embodiment as shown, in order to achieve regulatory of smart contracts, the decryption keys stored in the trusted execution environment may not include the decryption keys corresponding to the regulated smart contracts. That is, the trusted execution environment can store the decryption keys corresponding to smart contract codes of unregulated smart contracts, and does not store and maintain the decryption keys corresponding to the smart contract codes of the regulated smart contracts.

For example, in an embodiment, when a user creates a smart contract account corresponding to a smart contract on the blockchain, the user can invoke a key generation algorithm installed in the trusted execution environment to create a root key for the contract account. After the root key is created, the smart contract regulatory rule can be further obtained, and whether the smart contract is a regulated smart contract is determined based on the obtained smart contract regulatory rule in the trusted execution environment. The embodiment process of determining whether the smart contract is a regulated smart contract will not be elaborated here.

If it is determined that the target smart contract is not a regulated smart contract, the generated root key can be further stored and maintained in a trusted execution environment. Conversely, if it is determined that the target smart contract is a regulated smart contract, the trusted execution environment can no longer store and maintain the generated root key, and in this case, the generated root key can be discarded. For example, if asymmetric encryption method is applied, the public key in the root key can be transmitted to the user to be held by the user, and the private key in the root key can be discarded. If the symmetric encryption method is applied, a copy of the generated key can be transmitted to the user, and then the generated key is discarded.

In an example, it may be determined in the trusted execution environment based on the obtained smart contract regulatory rule that the target smart contract is a regulated smart contract. Since the decryption key stored in the trusted execution environment corresponds to the contract codes of the regulated smart contract is prohibited to be extracted, or the decryption key corresponding to the contract codes of the regulated smart contract is not stored in the trusted execution environment, the decryption key may not be extracted to perform decryption on the contract codes of the target smart contract. That is, the contract codes of the target smart contract may not be executed. Therefore, in this case, the invoking process for the target smart contract can be terminated directly, and a prompt message of failure in invoking the target smart contract is returned to the client.

If it is determined in the trusted execution environment based on the obtained smart contract regulatory rule that the target smart contract is not a regulated smart contract, the decryption key corresponding to the contract codes of the target smart contract is further extracted from the trusted execution environment, and the contract codes of the target smart contract are decrypted based on the decryption key. The method of decrypting the contract codes of the target smart contract based on the extracted decryption key corresponds to the encryption method applied when the smart contract is deployed.

As described previously, when the target smart contract is deployed, the smart contract codes of the target smart contract are encrypted using symmetric encryption. For example, the private key of the symmetric encryption algorithm is used for encryption. In this case, the private key of the symmetric encryption is directly used for decryption.

In one example, when the target smart contract is deployed, the contract codes of the target smart contract may be encrypted with asymmetric encryption, (for example, the private key with asymmetric encryption is used for encryption). In this example, the public key with asymmetric encryption may be directly used for decryption.

Further, in one example, when the target smart contract is deployed, the contract codes of the target smart contract may use a combination of symmetric encryption and asymmetric encryption, (for example, the contract codes are encrypted with the private key of the symmetric encryption algorithm), and the public key of the asymmetric encryption algorithm may be used to encrypt the private key used in the symmetric encryption algorithm. In this case, the private key of the asymmetric encryption algorithm may be used to decrypt the private key used in the symmetric encryption algorithm first. Then, the decrypted private key of the symmetric encryption algorithm may be used to decrypt the encrypted contract codes.

In the present disclosure, the trusted execution environment installed in the node device can be a trusted execution environment based on a secure extension of the CPU hardware and isolated from the outside.

The trusted execution environment is a concept originally proposed by Global Platform, which is used to solve the security isolation of resources on mobile devices, and provides a trusted and secure execution environment for applications in parallel with the operating system. Trust Zone technology of ARM was the first to implement a truly commercial TEE technology.

With the rapid development of the Internet, the demand for security is getting increasingly higher. Mobile devices, cloud devices, and data centers, among other, have put more demands on TEE. The concept of TEE has also been rapidly developed and expanded. The TEE now is a broader TEE than the original concept. For example, server chip manufacturers Intel and AMD have launched hardware-assisted TEE and enriched the concept and characteristics of TEE, which has been widely recognized in the industry. The TEE mentioned now usually refers more to this type of hardware-assisted TEE technology. Unlike mobile terminals, cloud access requires remote access, and end users are not visible to the hardware platform, so the first step in using TEE is to confirm the authenticity of TEE. Therefore, the current TEE technology has introduced a remote certification mechanism, which is endorsed by hardware manufacturers (mainly CPU manufacturers) and digital signature technology is used to ensure that users can verify the TEE state. In addition, the security resource isolation may not meet the security requirements, and further data privacy protection is also proposed. Commercial TEE, including Intel SGX and AMD SEV, also provide memory encryption technology. Trusted hardware is limited to the inside of the CPU. The data of the bus and the memory are ciphertext to prevent malicious users from snooping. For example, TEE technologies such as Intel's Software Protection Extension (SGX) isolate code execution, remote attestation, secure configuration, secure storage of data, and trusted paths for code execution. Applications running in TEE are secured and are almost impossible to be accessed by third parties.

In an embodiment, taking the trusted execution environment being Intel SGX as an example, SGX provides an enclave, that is, an encrypted trusted execution area in the memory, in which data is protected by the CPU from theft. Taking the node device using a CPU that supports SGX as an example, the CPU can use the newly added processor instructions to allocate a part of the area EPC (Enclave Page Cache) in the memory, in which the data is encrypted by an encryption engine MEE (Memory Encryption Engine).

The encrypted content in EPC can be decrypted into plaintext after entering the CPU. Therefore, in SGX, users can distrust the operating system, the VMM (Virtual Machine Monitor), or even the BIOS (Basic Input Output System), and can trust the CPU to ensure that private data will not be leaked. In an implementation, the private data can be encrypted and transmitted to the enclave in cipher text, and the corresponding key can also be transmitted to the enclave through remote certificate. Then, the data is used for calculations under the encryption protection of the CPU, and the result is returned in cipher text. In this mode, it allows enjoying powerful computing power without worrying about data leakage.

In this case, the node device can load the deployed virtual machine into the enclave provided by SGX technology. After the contract codes of the target smart contract are decrypted based on the extracted decryption key to obtain the plaintext contract codes of the target smart contract, the node device can use the new processor instruction in the CPU and can allocate a part of the area EPC in the memory, and the plaintext contract codes obtained by the encryption engine MEE in the CPU are encrypted and stored in the EPC. The encrypted content in the EPC is decrypted into plaintext after entering the CPU. In the CPU, the plaintext codes are operated to complete the code execution process.

After the node device executes the plaintext contract codes of the target smart contract in the executable environment, the execution result of the plaintext contract codes can also be encrypted, and then the encrypted execution result is transmitted to the distributed ledgers of the blockchain for storage.

For example, due to the execution result of the plaintext contract codes of the target smart contract usually cause change in the state of the smart contract, the execution result of the plaintext contract codes is usually stored in the state database of the blockchain. For example, taking Ethereum as an example, the execution result of the plaintext contract codes is usually stored in the receipt tree in the state database of the blockchain as part of the transaction receipt of the invoking transaction for the current invoking.

In the present disclosure, the encryption method applied to encrypt the execution result of the contract codes of the target smart contract can be a symmetric encryption method or an asymmetric encryption method.

For example, taking the trusted execution environment being Intel SGX as an example, the encryption key used when writing the execution result of the contract codes in the distributed ledgers of the blockchain is usually called secret key. The secret key can be a symmetric encryption key or an asymmetric encryption key. If the secret key is a symmetric encryption key, it is usually called a seal (Simple Encrypted Arithmetic Library) key. Based on Intel SGX technology, the seal key can be the key transmitted to the blockchain node by the key management server through remote certification.

In the technical solution, when the node device in the blockchain executes the encrypted contract codes of the smart contract in the trusted execution environment installed, smart contract codes of unmanaged smart contract can be decrypted and executed. On the basis of adequate privacy protection of smart contracts, the content of some managed smart contracts can be shielded through technical means to achieve regulatory of the smart contract.

Figure 5:
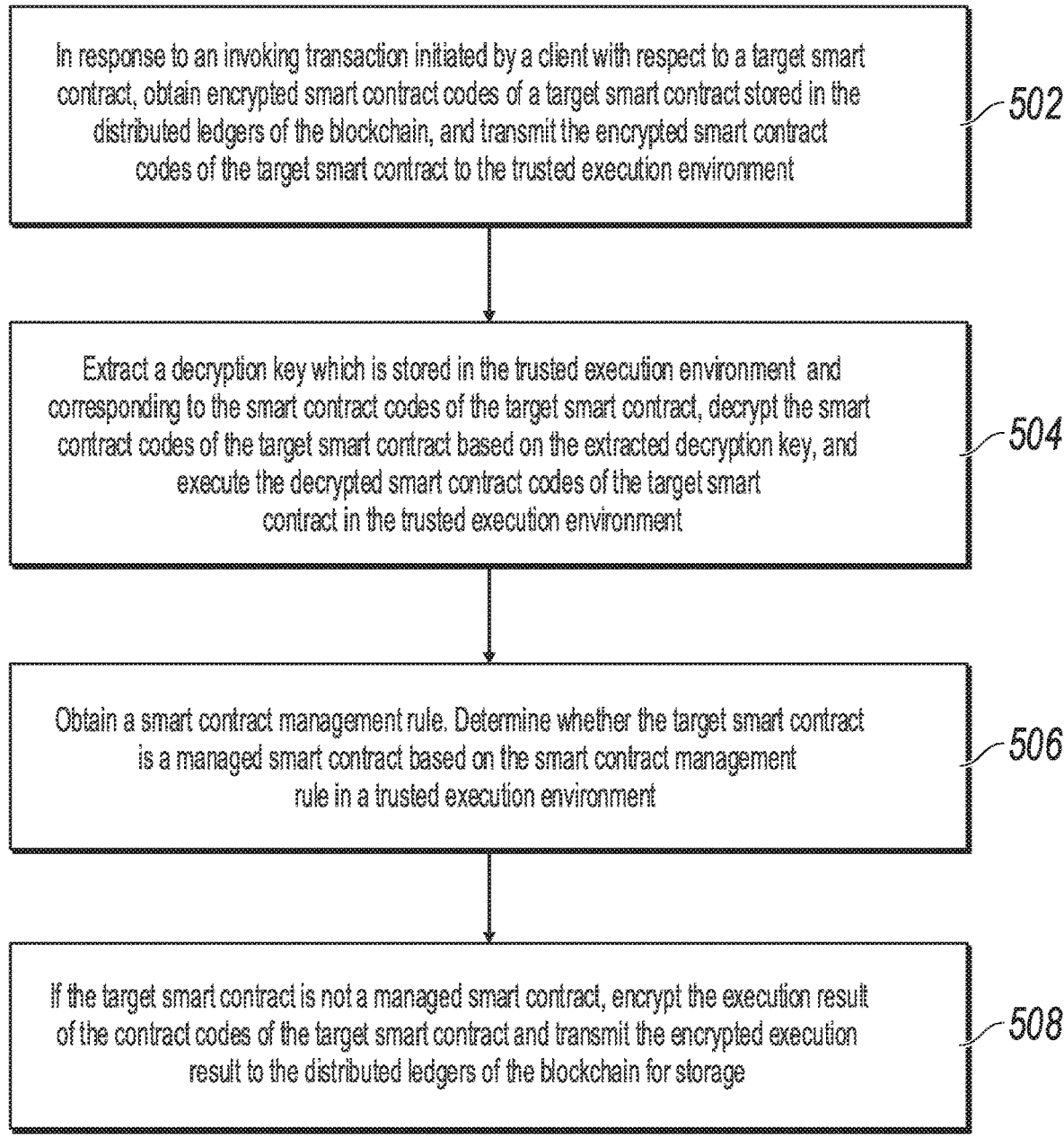
FIG. 5 is a flowchart illustrating another method for managing a smart contract based on a blockchain according to an embodiment of the present disclosure.

Referring to FIG. 5, which is a flowchart illustrating another method for managing a smart contract based on a blockchain according to an example of an embodiment. As shown in FIG. 5, the method is applied to a node device in a blockchain. The node device is installed with a trusted execution environment. The trusted execution environment stores decryption keys corresponding to encrypted contract codes of smart contracts stored in distributed ledgers of the blockchain. The method includes the following steps.

At step 502, in response to an invoking transaction initiated by a client with respect to a target smart contract, encrypted smart contract codes of the target smart contract stored in the distributed ledgers of the blockchain are obtained, and the encrypted smart contract codes of the target smart contract are transmitted to the trusted execution environment.

At step 504, a decryption key which is stored in the trusted execution environment and corresponding to the smart contract codes of the target smart contract, is extracted, the smart contract codes of the target smart contract are decrypted based on the extracted decryption key, and the decrypted smart contract codes of the target smart contract are executed in the trusted execution environment.

In the present disclosure, in the trusted execution environment, the decryption keys corresponding to the smart contract codes of all smart contracts included in the distributed ledgers of the blockchain can be stored by default.

After the encrypted smart contract codes of the target smart contract are transmitted to the trusted execution environment installed in the node device, the decryption key corresponding to the target smart contract, which is stored in the trusted execution environment, can be extracted, based on the decryption key, the smart contract codes of the target smart contract are decrypted, and the decrypted smart contract codes are executed in a trusted execution environment.

At step 506, a smart contract management rule is obtained. It is determined whether the target smart contract is a managed smart contract based on the smart contract management rule in a trusted execution environment.

At step 508, if the target smart contract is not a managed smart contract, the execution result of the contract codes of the target smart contract are encrypted and transmitted to the distributed ledgers of the blockchain for storage.

In the present disclosure, after the execution of the smart contract codes of the target smart contract is completed, the execution result of the smart contract codes can be cached in the trusted execution environment, and by further determining whether the target smart contract is a regulated smart contract to decide whether the execution result of the contract codes can be encrypted and transmitted to the distributed ledgers of the blockchain for storage.

In some embodiments, the hardware carrying the trusted execution environment can further obtain the smart contract regulatory rule, and determine whether the target smart contract is a regulated smart contract based on the obtained smart contract regulatory rule in the trusted execution environment. The embodiment process is not elaborated here, and reference can be made to the previous embodiment.

In an embodiment, if the target smart contract is a regulated smart contract, the cached execution result of the smart contract codes of the target smart contract can be deleted, and a prompt message of failure in invoking the target smart contract is returned to the client.

In another embodiment, if the target smart contract is a managed smart contract, the execution result of the smart contract codes of the target smart contract can also be switched from a cache mode to persistently stored in the trusted execution environment, and the execution result persistently stored in the trusted execution environment is set to a state in which extraction is prohibited. At the same time, a prompt message of failure in invoking the target smart contract is returned to the client.

If the target smart contract is not a regulated smart contract, the execution result of the contract codes of the target smart contract cached in the trusted execution environment can be encrypted, and then the encrypted execution result is transmitted to the distributed ledgers of the blockchain for storage. The embodiment process is elaborated here, and reference can be made to the previous embodiment.

In the technical solution, after the node device in the blockchain executes the decrypted smart contract's codes in the installed trusted execution environment, the execution result of smart contract codes of an unmanaged smart contract is further encrypted and transmitted to the distributed ledgers of the blockchain for storage. Therefore, on the basis of adequate privacy protection of smart contracts, the content of some managed smart contracts can be shielded through technical means to achieve regulatory of the smart contracts. Corresponding to the method embodiment, this application also provides an embodiment of an apparatus.

Corresponding to the method embodiment, the present disclosure also provides an embodiment of an apparatus for managing a smart contract based on a blockchain. The embodiment of the apparatus for managing a smart contract based on a blockchain of the present disclosure can be applied to an electronic device. The apparatus embodiment can be implemented by software, or by hardware or a combination of software and hardware. Taking software embodiment as an example, as an apparatus in a logical sense, it is formed by reading the corresponding computer program instructions in the non-volatile memory into the memory through the processor of the electronic device where it is located. In terms of hardware, as shown in FIG. 6, which is a hardware structure diagram of the electronic device where the apparatus for managing a smart contract based on a blockchain of the present disclosure is located, in addition to the processor, the memory, the network interface, and the non-volatile memory, the electronic device in which the apparatus is located in the embodiment can generally include other hardware based on the actual function of the electronic device, and details are omitted here for simplicity.

Figure 7:
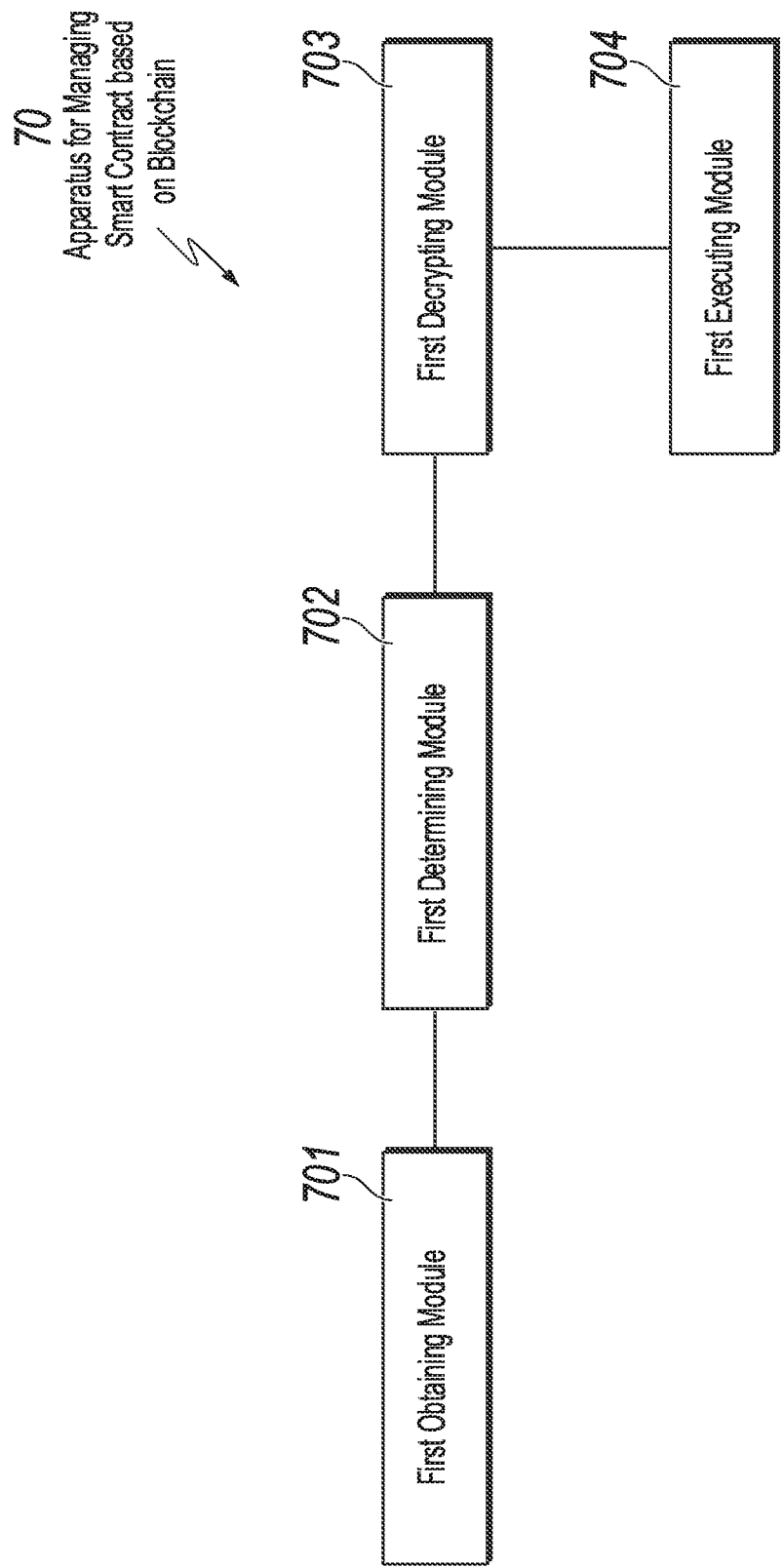
FIG. 7 is a block diagram illustrating an apparatus for managing a smart contract based on a blockchain according to an embodiment of the present disclosure.

FIG. 7 is a block diagram of an apparatus for managing a smart contract based on a blockchain according to an example of an embodiment of the present disclosure.

Figure 6:
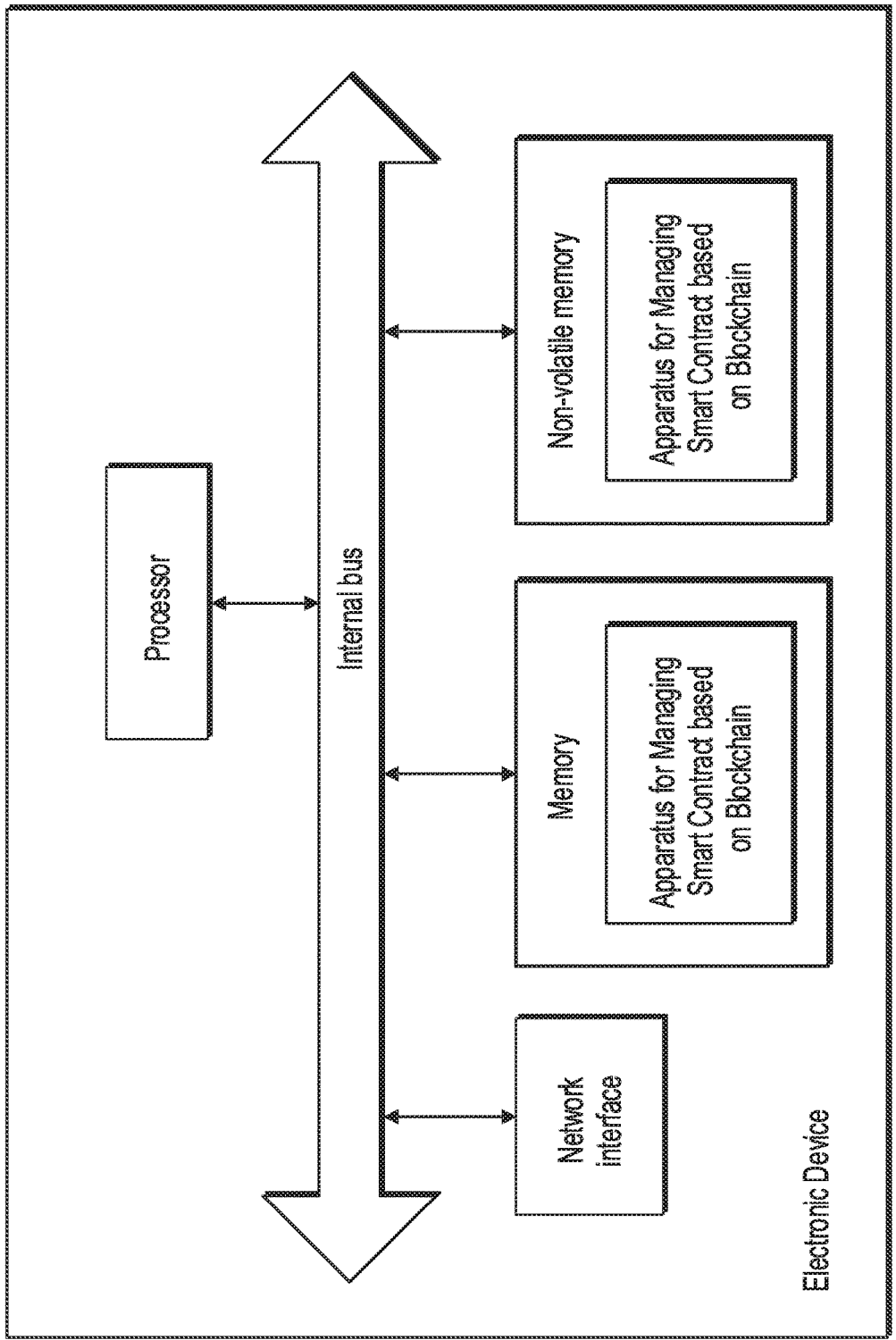
FIG. 6 is a schematic structural diagram illustrating an electronic device according to an embodiment of the present disclosure.

Referring to FIG. 7, the apparatus 70 for managing a smart contract based on a blockchain can be applied to the electronic device shown in FIG. 6, the electronic device is installed with a trusted execution environment. The apparatus includes: a first obtaining module 701 configured to, in response to an invoking transaction initiated by a client with respect to a target smart contract, obtain encrypted contract codes of a target smart contract stored in distributed ledgers of the blockchain, and transmit the encrypted contract codes of the target smart contract to the trusted execution environment; a first determining module 702 configured to obtain a smart contract management rule, and determine in the trusted execution environment whether the target smart contract is a managed smart contract based on the smart contract management rule; a first decrypting module 703 configured to, if the target smart contract is not a managed smart contract, extract a decryption key which is stored in the trusted execution environment and corresponding to the contract codes of the target smart contract, and based on the extracted decryption key, decrypt the contract codes of the target smart contract; and a first executing module 704 configured to execute the decrypted contract codes of the target smart contract in the trusted execution environment, encrypt the execution result and transmit the encrypted execution result to the distributed ledgers of the blockchain for storage.

In the embodiment, the trusted execution environment stores decryption keys corresponding to encrypted contract codes of smart contracts stored in the distributed ledgers of the blockchain.

Decryption keys corresponding to managed smart contracts, which are stored in the trusted execution environment, are set as extraction prohibited. In some embodiments, the decryption keys stored in the trusted execution environment do not include the decryption keys corresponding to the managed smart contracts.

In the embodiment, the apparatus 70 further includes: a first returning module 705 (not shown in FIG. 7) configured to, if the target smart contract is a managed smart contract, return a prompt message of failure in invoking the target smart contract to the client.

In the embodiment, the apparatus 70 further includes: a receiving module 706 configured to receive a creation transaction initiated by a client with respect to a target smart contract; wherein the creation transaction includes encrypted contract codes of the target smart contract; and a creating module 707 configured to, in response to the creation transaction, execute smart contract creation codes in the trusted execution environment, create a contract account corresponding to the target smart contract in the blockchain, and transmit the encrypted contract codes of the target smart contract to the distributed ledgers of the blockchain for storage.

In the embodiment, the first obtaining module 701 is configured to: obtain a smart contract management rule from a distributed ledger of a management blockchain; where the smart contract management rule is a smart contract management rule generated by a management party invoking a smart contract deployed on the management blockchain.

In the embodiment, the smart contract management rule includes: a smart contract blacklist consisting of contract addresses of managed smart contracts.

The first determining module 702 is configured to: obtain a contract address of the target smart contract in the invoking transaction; match the contract address of the target smart contract with the contract addresses in the smart contract blacklist; and if the contract address of the target smart contract matches any one of the contract addresses in the smart contract blacklist, determine that the target smart contract is a managed smart contract; otherwise, determine that the target smart contract is not a managed smart contract.

In the embodiment, the encryption method applied for the contract codes of the target smart contract includes any one of the following encryption methods: a symmetric encryption method, an asymmetric encryption method, or a symmetric encryption method combined with an asymmetric encryption method.

The encryption method applied for the execution result of the contract codes of the target smart contract includes: a symmetric encryption method; or an asymmetric encryption method.

In the embodiment, the symmetric encryption method combined with the asymmetric encryption method includes a digital envelope encryption method.

In the embodiment, the trusted execution environment includes Intel SGX.

Figure 8:
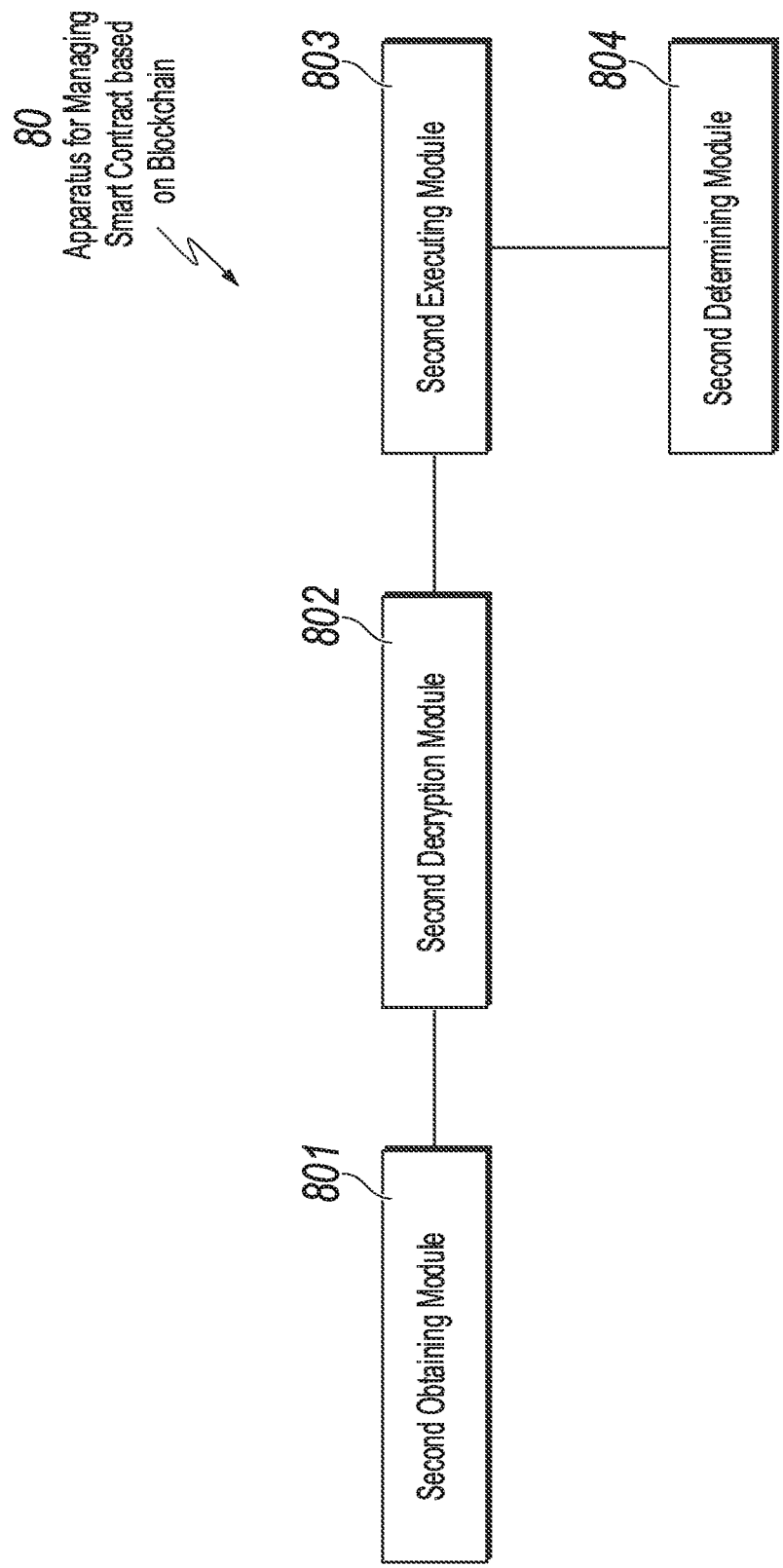
FIG. 8 is a block diagram illustrating an apparatus for managing a smart contract based on a blockchain according to an embodiment of the present disclosure.

FIG. 8 is a block diagram of an apparatus for managing a smart contract based on a blockchain according to an embodiment of the present disclosure.

Referring to FIG. 8, the apparatus 80 for managing a smart contract can be applied to the electronic device shown in FIG. 6, which is installed with a trusted execution environment. The trusted execution environment stores decryption keys corresponding to encrypted contract codes of smart contracts stored in distributed ledgers of the blockchain. The apparatus 80 includes: a second obtaining module 801 configured to, in response to an invoking transaction initiated by a client with respect to a target smart contract, obtain encrypted contract codes of a target smart contract stored in the distributed ledgers of the blockchain, and transmit the encrypted contract codes of the target smart contract to the trusted execution environment; a second decryption module 802 configured to extract a decryption key which is stored in the trusted execution environment and corresponding to the contract codes of the target smart contract, and decrypt the contract codes of the target smart contract based on the extracted decryption key; a second executing module 803 configured to execute the decrypted contract codes of the target smart contract in the trusted execution environment; and a second determining module 804 configured to obtain a smart contract management rule, and determine whether the target smart contract is a managed smart contract based on the smart contract management rule in a trusted execution environment; if the target smart contract is not a managed smart contract, encrypt the execution result of the contract codes of the target smart contract and transmit the encrypted execution result to the distributed ledgers of the blockchain for storage.

In the embodiment, the apparatus 80 further includes: a second returning module 805 (not shown in FIG. 8) configured to, if the target smart contract is a managed smart contract, delete the execution result of the contract codes of the target smart contract, and return a prompt message of failure in invoking the target smart contract to the client; or if the target smart contract is a managed smart contract, store the execution result of the contract codes of the target smart contract in the trusted execution environment, set the execution result stored in the trusted execution environment as extraction prohibited; and return a prompt message of failure in invoking the target smart contract to the client.

The system, apparatus, module, or unit described in the previous embodiments can be implemented by a computer chip or entity, or can be implemented by using a product with a certain function. An embodiment device is a computer, and the form of the computer can be a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

In a configuration, a computer includes one or more of a processor (CPU), an input/output interface, a network interface, and a memory.

The memory can include a transitory memory, a random access memory (RAM), and/or a non-volatile memory in a computer-readable medium, such as a read-only memory (ROM) or a flash RAM. The memory is an example of a computer-readable medium.

The computer-readable medium includes persistent, non-persistent, removable or non-removable medium, which can store information by any method or technology. Information can be computer-readable instructions, data structures, modules of a program, or other data. Examples of computer storage media include, but are not limited to, a parameter random access memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a compact disc read-only memory (CD-ROM), a digital versatile disc (DVD) or other optical storage, a cassette magnetic tape, magnetic disk storage, a quantum memory, graphene-based storage media, or other magnetic storage devices or any other non-transmission media can be used to store information that can be accessed by computing devices. Based on the definition in the present disclosure, computer-readable media does not include transitory computer-readable media (transitory media), such as modulated data signals and carrier waves.

It is worthwhile to further note that the term "include", "comprise", or their any other variant is intended to cover a nonexclusive inclusion, so that a process, a method, a product, or a device that includes a series of elements not only includes these elements, but also includes other elements which are not expressly listed, or further includes elements inherent to such process, method, product, or device. An element described by "includes a . . . " further includes, without more constraints, another same or identical element in the process, method, product, or device that includes the element.

The embodiments of the present disclosure have been described above. Other embodiments are within the scope of the following claims. In some cases, the actions or steps recited in the claims can be performed in a different order than in the embodiments and the desired result can still be achieved. In addition, the processes depicted in the figures do not necessarily require the particular order shown or sequential order to achieve the desired results. In some embodiments, multitasking and parallel processing are also possible or can be advantageous.

The terms used in the present disclosure are for the purpose of describing particular examples only, and are not intended to limit the present disclosure. Terms determined by "a", "the" and "said" in their singular forms in the present disclosure and the appended claims are also intended to include plurality, unless clearly indicated otherwise in the context. It should also be understood that the term "and/or" as used herein is and includes any and all possible combinations of one or more of the associated listed items.

It is to be understood that, although terms "first," "second," "third," and the like can be used in the present disclosure to describe various information, such information should not be limited to these terms. These terms are only used to distinguish one category of information from another. For example, without departing from the scope of the present disclosure, first information can be referred as second information. Similarly, second information can also be referred as first information. Depending on the context, the word "if" as used herein can be interpreted as "when" or "upon" or "in response to determining".

The previous descriptions are merely some embodiments of the present disclosure, and are not intended to limit the present disclosure. Any modifications, equivalent replacements, and improvements made within the spirit and the principle of the present disclosure shall fall within the scope of the claims in the present disclosure.

What is claimed:

1. A computer-implemented method comprising:
   in response to a first client device invoking a transaction with respect to a target smart contract, obtaining, by a blockchain node device in a blockchain, encrypted contract codes of the target smart contract, wherein the encrypted contract codes are stored in distributed ledgers of the blockchain, and wherein a trusted execution environment is installed on the blockchain node device;
   transmitting the encrypted contract codes of the target smart contract to the trusted execution environment;
   extracting a decryption key stored in the trusted execution environment, wherein the decryption key corresponds to the encrypted contract codes of the target smart contract;
   decrypting the encrypted contract codes of the target smart contract using the extracted decryption key, to obtain decrypted contract codes;
   executing the decrypted contract codes of the target smart contract in the trusted execution environment to obtain an execution result;
   obtaining a smart contract management rule;
   determining, in the trusted execution environment, that the target smart contract is a managed smart contract based on the smart contract management rule; and
   in response to determining that the target smart contract is a managed smart contract, transmitting, to the first client device, a failure message.

2. The computer-implemented method of claim 1, further comprising:
   in response to determining that the target smart contract is a managed smart contract, deleting the execution result.

3. The computer-implemented method of claim 1, further comprising, in response to determining that the target smart contract is a managed smart contract:
   storing the execution result in the trusted execution environment, and
   setting the execution result stored in the trusted execution environment as extraction-prohibited.

4. The computer-implemented method of claim 1, further comprising:
   receiving creation transaction data corresponding to a creation transaction initiated by a second client device with respect to the target smart contract, wherein the creation transaction data comprises the encrypted contract codes of the target smart contract;
   in response to receiving the creation transaction data, creating the target smart contract by executing smart contract creation codes in the trusted execution environment;
   creating a contract account on the blockchain, wherein the contract account corresponds to the target smart contract; and
   transmitting the encrypted contract codes of the target smart contract to the distributed ledgers of the blockchain for storage.

5. The computer-implemented method of claim 1, wherein obtaining the smart contract management rule comprises:
   monitoring, by the blockchain node device, data related to the target smart contract in an independent regulatory blockchain;
   in response to a regulatory party generating a latest smart contract regulatory rule by invoking a second smart contract deployed on the independent regulatory blockchain, storing the latest smart contract regulatory rule into a local storage of the blockchain node device; and
   reading, as the smart contract management rule, the latest smart contract regulatory rule from the local storage of the blockchain node device.

6. The computer-implemented method of claim 1, wherein the smart contract management rule comprises a smart contract blacklist comprising contract addresses of managed smart contracts, and
   wherein determining that the target smart contract is a managed smart contract based on the smart contract management rule comprises:
      obtaining a contract address of the target smart contract;
      matching the contract address of the target smart contract against the contract addresses in the smart contract blacklist; and
      in response to determining that the contract address of the target smart contract matches one of the contract addresses in the smart contract blacklist, determining that the target smart contract is a managed smart contract.

7. A non-transitory, computer-readable medium storing one or more instructions that, when executed by a computer system, cause the computer system to perform operations comprising:
   in response to a first client device invoking a transaction with respect to a target smart contract, obtaining, by a blockchain node device in a blockchain, encrypted contract codes of the target smart contract, wherein the encrypted contract codes are stored in distributed ledgers of the blockchain, and wherein a trusted execution environment is installed on the blockchain node device;
   transmitting the encrypted contract codes of the target smart contract to the trusted execution environment;
   extracting a decryption key stored in the trusted execution environment, wherein the decryption key corresponds to the encrypted contract codes of the target smart contract;
   decrypting the encrypted contract codes of the target smart contract using the extracted decryption key, to obtain decrypted contract codes;

executing the decrypted contract codes of the target smart contract in the trusted execution environment to obtain an execution result;

obtaining a smart contract management rule;

determining, in the trusted execution environment, that the target smart contract is a managed smart contract based on the smart contract management rule; and in response to determining that the target smart contract is a managed smart contract, transmitting, to the first client device, a failure message.

8. The non-transitory, computer-readable medium of claim 7, wherein the operations further comprise, in response to determining that the target smart contract is a managed smart contract, deleting the execution result.

9. The non-transitory, computer-readable medium of claim 7, wherein the operations further comprise, in response to determining that the target smart contract is a managed smart contract:

storing the execution result in the trusted execution environment, and setting the execution result stored in the trusted execution environment as extraction-prohibited.

10. The non-transitory, computer-readable medium of claim 7, wherein the operations further comprise:

receiving creation transaction data corresponding to a creation transaction initiated by a second client device with respect to the target smart contract, wherein the creation transaction data comprises the encrypted contract codes of the target smart contract;

in response to receiving the creation transaction data, creating the target smart contract by executing smart contract creation codes in the trusted execution environment;

creating a contract account on the blockchain, wherein the contract account corresponds to the target smart contract; and transmitting the encrypted contract codes of the target smart contract to the distributed ledgers of the blockchain for storage.

11. The non-transitory, computer-readable medium of claim 7, wherein obtaining the smart contract management rule comprises:

monitoring, by the blockchain node device, data related to the target smart contract in an independent regulatory blockchain;

in response to a regulatory party generating a latest smart contract regulatory rule by invoking a second smart contract deployed on the independent regulatory blockchain, storing the latest smart contract regulatory rule into a local storage of the blockchain node device; and reading, as the smart contract management rule, the latest smart contract regulatory rule from the local storage of the blockchain node device.

12. The non-transitory, computer-readable medium of claim 7, herein the smart contract management rule comprises a smart contract blacklist comprising contract addresses of managed smart contracts, and wherein determining that the target smart contract is a managed smart contract based on the smart contract management rule comprises:

obtaining a contract address of the target smart contract;

matching the contract address of the target smart contract against the contract addresses in the smart contract blacklist; and in response to determining that the contract address of the target smart contract matches one of the contract addresses in the smart contract blacklist, determining that the target smart contract is a managed smart contract.

13. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

in response to a first client device invoking a transaction with respect to a target smart contract, obtaining, by a blockchain node device in a blockchain, encrypted contract codes of the target smart contract, wherein the encrypted contract codes are stored in distributed ledgers of the blockchain, and wherein a trusted execution environment is installed on the blockchain node device;

transmitting the encrypted contract codes of the target smart contract to the trusted execution environment;

extracting a decryption key stored in the trusted execution environment, wherein the decryption key corresponds to the encrypted contract codes of the target smart contract;

decrypting the encrypted contract codes of the target smart contract using the extracted decryption key, to obtain decrypted contract codes;

executing the decrypted contract codes of the target smart contract in the trusted execution environment to obtain an execution result;

obtaining a smart contract management rule;

determining, in the trusted execution environment, that the target smart contract is a managed smart contract based on the smart contract management rule; and in response to determining that the target smart contract is a managed smart contract, transmitting, to the first client device, a failure message.

14. The computer-implemented system of claim 13, wherein the operations further comprise, in response to determining that the target smart contract is a managed smart contract, deleting the execution result.

15. The computer-implemented system of claim 13, wherein the operations further comprise, in response to determining that the target smart contract is a managed smart contract:

storing the execution result in the trusted execution environment, and setting the execution result stored in the trusted execution environment as extraction-prohibited.

16. The computer-implemented system of claim 13, wherein the operations further comprise:

receiving creation transaction data corresponding to a creation transaction initiated by a second client device with respect to the target smart contract, wherein the creation transaction data comprises the encrypted contract codes of the target smart contract;

in response to receiving the creation transaction data, creating the target smart contract by executing smart contract creation codes in the trusted execution environment;

creating a contract account on the blockchain, wherein the contract account corresponds to the target smart contract; and transmitting the encrypted contract codes of the target smart contract to the distributed ledgers of the blockchain for storage.

17. The computer-implemented system of claim 13, wherein obtaining the smart contract management rule comprises:
- monitoring, by the blockchain node device, data related to the target smart contract in an independent regulatory blockchain;
- in response to a regulatory party generating a latest smart contract regulatory rule by invoking a second smart contract deployed on the independent regulatory blockchain, storing the latest smart contract regulatory rule into a local storage of the blockchain node device; and
- reading, as the smart contract management rule, the latest smart contract regulatory rule from the local storage of the blockchain node device.

18. The computer-implemented system of claim 13, herein the smart contract management rule comprises a smart contract blacklist comprising contract addresses of managed smart contracts, and
- wherein determining that the target smart contract is a managed smart contract based on the smart contract management rule comprises:
  - obtaining a contract address of the target smart contract;
  - matching the contract address of the target smart contract against the contract addresses in the smart contract blacklist; and
  - in response to determining that the contract address of the target smart contract matches one of the contract addresses in the smart contract blacklist, determining that the target smart contract is a managed smart contract.

* * * * *